United States Patent [19]
Williams

[11] Patent Number: 5,188,149
[45] Date of Patent: Feb. 23, 1993

[54] DIVERTER VALVE

[76] Inventor: Richard T. Williams, P.O. Box 39, Uwchland, Chester County, Pa. 19480

[21] Appl. No.: 711,083

[22] Filed: Jun. 6, 1991

[51] Int. Cl.$^5$ ............................................. F16K 11/06
[52] U.S. Cl. ............................... 137/625.47; 137/876; 251/175; 251/185
[58] Field of Search ................... 137/597, 876, 625.47; 251/304, 185, 175

[56] References Cited

U.S. PATENT DOCUMENTS

| | | | |
|---|---|---|---|
| 1,053,327 | 2/1913 | Stebbins | 137/876 |
| 3,889,923 | 6/1975 | Saville et al. | 251/311 X |
| 4,073,471 | 2/1978 | Lehtinen | 251/185 X |
| 4,436,116 | 3/1984 | Billeter | 137/625.47 |

FOREIGN PATENT DOCUMENTS

| | | | |
|---|---|---|---|
| 379233 | 7/1990 | European Pat. Off. | 251/304 |
| 350265 | 7/1937 | Italy | 137/625.47 |
| 2072307 | 9/1981 | United Kingdom | 137/625.47 |

*Primary Examiner*—Stephen M. Hepperle
*Attorney, Agent, or Firm*—John F. A. Earley; John F. A. Earley, III

[57] ABSTRACT

A diverter valve has an IN port and first and second OUT ports which are positioned along an arcuate path. A rotor has an external control knob and a stem extending within the cavity of the valve body. Mounted on the stem, at right angles thereto, is a closure pin which extends into the bore of the hub of a mushroom-shaped closure element. The surface of the domed head of the closure element is in contact with an O-ring seal at one of the OUT ports. When the rotor is moved, the O-ring, in contact with the surface of the domed head, cams the closure element inwardly causing the element to slide on the closure pin and causing the closure pin to enter more deeply into a recess in the head of the closure element. When the closure element is in place to close-off one of the OUT ports, the other OUT port is opened and the pressure of the water flowing through the valve exerts a direct pressure on the flat annular undersurface of the head of the closure element. The lines of force of such pressure are perpendicular to the closure elements undersurface thereby maintaining the closure element in tight contact with the O-ring seal. Although not essential to the operation of the diverter valve, a light compression spring may be placed surrounding the hub of the closure element.

18 Claims, 3 Drawing Sheets 5,188,149

DIVERTER VALVE

FIELD OF THE INVENTION

This invention relates to diverter valves which are used to divert fluid, usually water, from a normal outlet to an alternative outlet, and more particularly relates to diverter valves used in a purification system where the valve is used to control the flow of water to a normal outlet or alternatively through a purification unit to a second outlet, as where drinking water is desired.

BACKGROUND OF THE INVENTION

Diverter valves are well known. In one known form, a toggle or plunger is actuated manually, usually by tipping the toggle or pulling or pushing the plunger. Water pressure from the water flowing through the valve maintains the toggle or plunger in its actuated position, and in this position, the main stream of water is diverted to the alternative outlet. When the water is shut off and the pressure is relieved, the toggle or plunger should return to its former normal position. However, frequently this does not happen due to the accumulation of calcium or other debris in the diverter valve around the toggle or plunger. Further, frequently the toggle or plunger sticks in a half way position so that when next used some water comes out the normal spout and some water comes out the alternative spout.

A common usage of diverter valves is in the bathroom where the toggle or plunger is used to control whether the water flows out of the bathtub faucet or out of the shower head. However, the present invention is more particularly related to a diverter valve used in a purification system where the valve is used to control the flow of water to a normal outlet or alternatively through a purification unit to a second outlet, as where drinking water is desired.

SUMMARY OF THE INVENTION

A principal object of the present invention is to provide a diverter valve which avoids the unreliable action of the toggle or plunger types of diverter valves and the disadvantages thereof.

Another object is to provide a diverter valve which is fully manual and which remains in the position in which it is put until changed by manual action.

Another object is to provide a diverter valve in which the control action is rotary rather than push-pull.

Yet another object is to provide a diverter valve in which the accumulation of calcium deposits (calcium carbonate or calcium bicarbonate) is of no consequence or importance since such accumulation does not cause sticking of the new valve.

Another object is to provide a diverter valve which is simple in construction and is easy to assemble and disassemble.

Yet another object is to provide a diverter valve in which the position of the valve is indicated by a control knob.

Yet another object is to provide a diverter valve which allows the source of water pressure, such as a faucet or spigot, to have full control of the rate of flow of water from the OUT ports of the diverter valve, even at low flow rates.

Another object is to provide a diverter valve having relatively large port holes so that the water pressure required is relatively low.

DETAILED DESCRIPTION OF THE DRAWINGS

Figure 1:
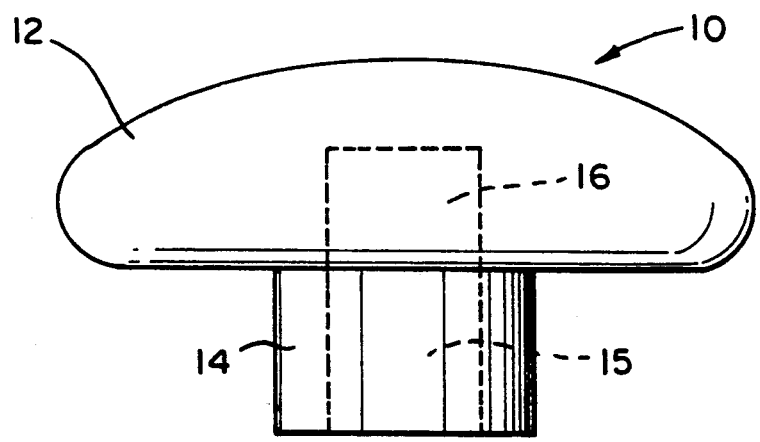
FIG. 1 is a view in front elevation of a valve closure element which because of its shape is sometimes referred to in the present application as a mushroom.

In FIG. 1, the mushroom closure element 10 of the present invention is shown. This element comprises a domed head 12 having a hub 14 having a bore 15 and a cylindrical recess 16 within the head 12 in alignment with and forming an extension of the bore 15 of hub 14.

Figure 3:
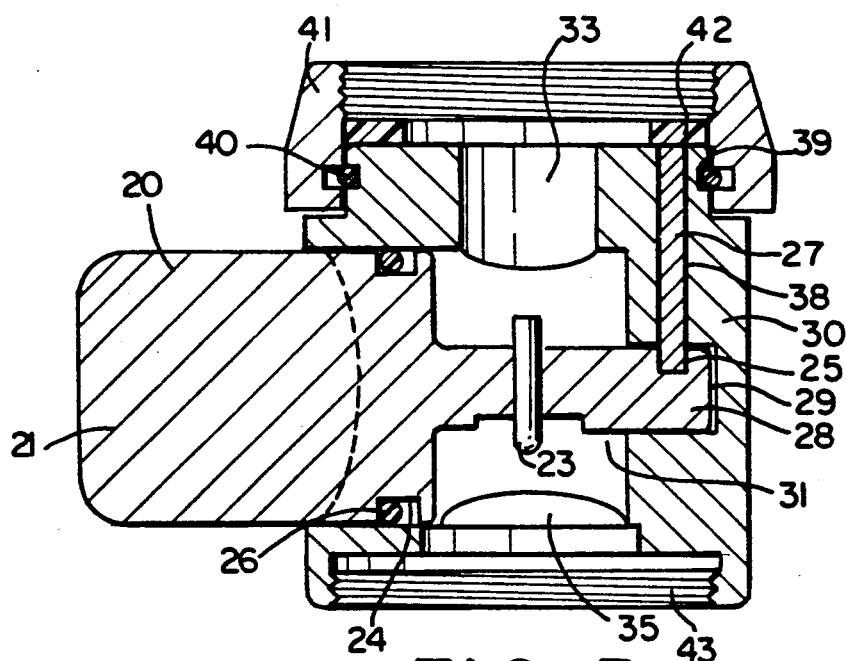
FIG. 3 is a view, in section, showing the diverter valve connected to a faucet connector. Also shown are the valve body, a rotor, the mushroom pin without a closure element or mushroom mounted thereon, and a body pin.
Figure 4:
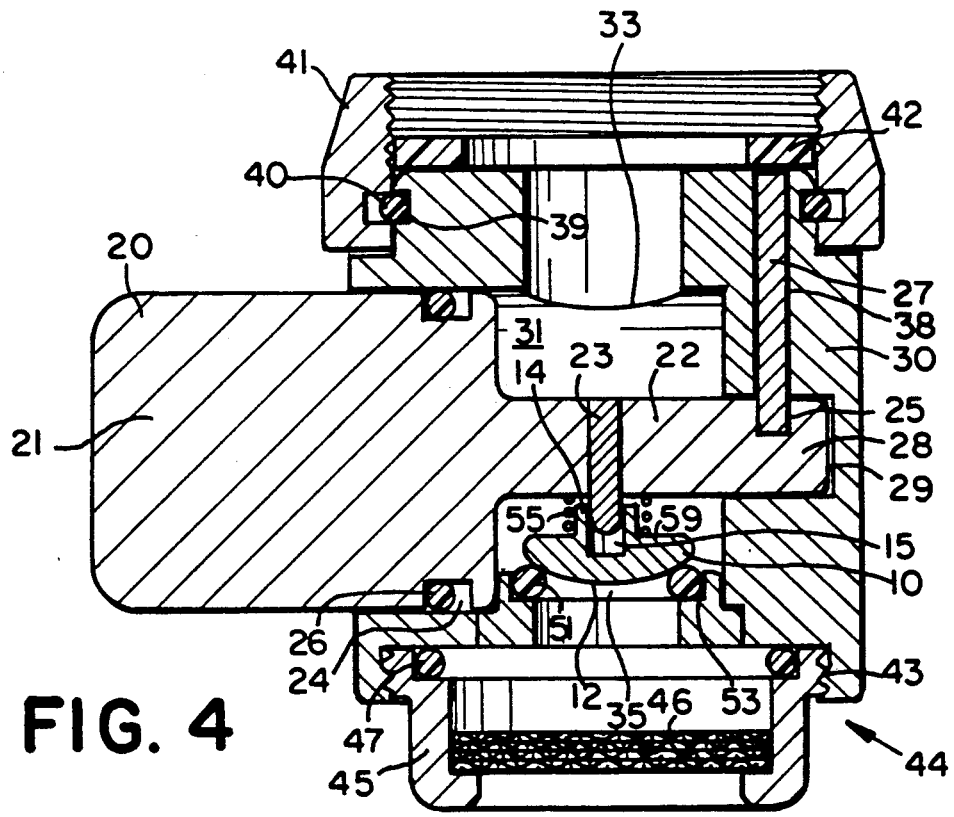
FIG. 4 is a view, in section, showing the valve body, the rotor, the mushroom pin, the closure element or mushroom, the body pin, and O-ring seals within the valve body.

FIGS. 3 and 4 show a rotor 20 having a control knob 21, a stem 22, and a mushroom pin 23. FIG. 4 shows mushroom closure element 10 mounted on mushroom pin 23, with the end portion of mushroom pin 23 being received within the bore 15 of hub 14 of mushroom closure element 10. Rotor 20 also is provided with a groove 24 for receiving an O-ring seal 26. Near the end of stem 22, there is a groove 25, which extends only a quarter of the way around stem 22, for receiving the end of a body pin 27 which connects the rotor 20 to the valve body 30. End portion 28 of rotor 20 is received in a recess 29 formed in valve body 30.

The surface of the control knob 21 may preferably be provided with flat surfaces, on opposite sides of the knob so that the position of the knob, which corresponds to the position of the mushroom 10 in the valve body 30, may be easily seen. Further, the flat surfaces aid in gripping and turning the rotor 20.

Figure 2:
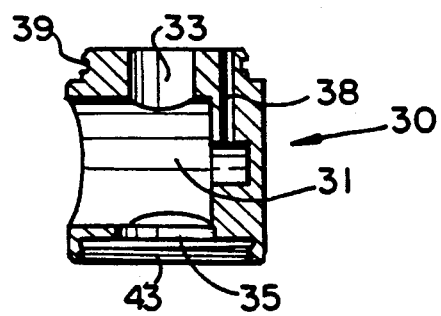
FIG. 2 is a view, in section, of a valve body of the diverter valve.
Figure 5:
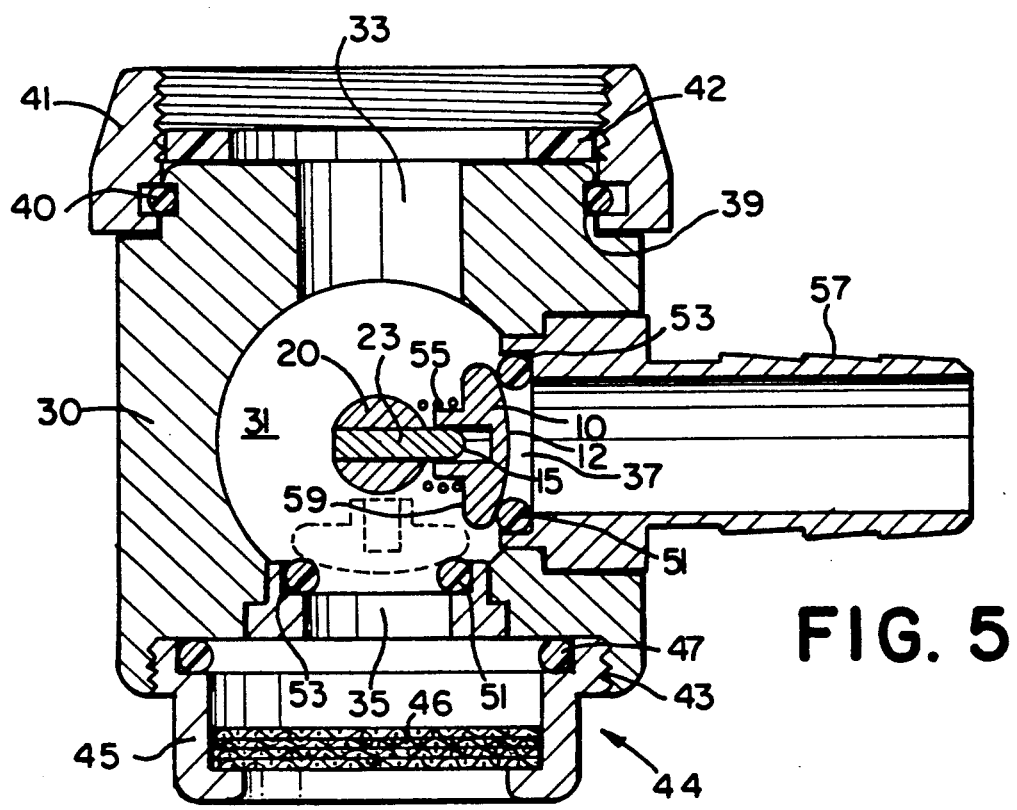
FIG. 5 is a view, in section, showing the two positions in which the mushroom closure element may be placed by the rotor.

FIGS. 2, 3, 4 and 5 show, in section, the valve body 30 of the diverter valve 11 having a cavity 31 and IN port 33 through which, for example, water from a source may flow into cavity 31 of the valve body 30. Also shown is OUT port 35. OUT port 37 is not visible in FIGS. 2, 3 and 4 and is seen in FIG. 5. FIG. 2, 3' and 4 also show bore 38 which receives body pin 27.

As shown in FIGS. 2-5, valve body 30 is provided with a channel 39 encircling the outer upper end portion of the valve body 30 which is adapted to receive a spring locking ring 40 (shown in FIGS. 3-5) which holds the valve body 30 to a faucet connector 41. As seen in FIGS. 3-5, a gasket 42 is provided between valve body 30 and faucet connector 41.

Threads 43 are provided at the inner lower end portion of the valve body 30 onto which an aerator assembly 44 (FIGS. 4 and 5) is screwed. Aerator assembly 44 includes an aerator body 45, aerator screens 46, and an aerator O-ring 47.

As seen in FIGS. 3 and 4, body pin 27 rests in bore 38 of valve body 30, and a portion of pin 27 protrudes from bore 38 and is received within the quarter groove 25 in the stem 22 of rotor 20. Body pin 27 limits to 90° the rotational movement of rotor 20 by blocking rotation of the rotor 20 beyond the length of groove 25. In addition to controlling the extent of rotation of rotor 20 to 90°, pin 27 also serves to hold the rotor 20 in place. The number of moving parts is thus minimized and, compared to typical prior art toggle or plunger type diverter valves, the number of components necessary to produce the diverter valve is reduced. Thus, a simplified diverter valve is obtained.

In FIG. 4, the mushroom-shaped closure element 10 is seen in cross-section with the nose of closure pin 23 extending partially into the bore 15 of hub 14 of the closure element 10. As shown, the domed head 12 of the closure element 10 is seated against an O-ring seal 51 which sits on an annular seat 53 at OUT port 35. Optionally, a light compression spring 55, which surrounds hub 14 of mushroom closure element 10, is provided to help maintain the domed head 12 of the closure element 10 consistently against the O-ring seal 51 during rotation.

FIG. 5 illustrates the two closed positions that the mushroom closure element 10 may take. In solid line, the closure element 10 is shown in its normal position in which it functions to close the OUT port 37 which leads to the filter system through a barb connector 57 which is press-fitted into the diverter valve 11. The OUT port 35 is open. Water from the source flows through the IN port 33 through the valve body 30 and out through the OUT port 35. Water pressure is exerted at right angles to the flow and the pressure serves to maintain the domed head 12 of the mushroom closure element 10 in close contact with the O-ring seal 51, thereby sealing OUT port 37.

The lines of force of water pressure are parallel to the axis of the mushroom pin 23 and perpendicular to the flat annular under surface 59 of the closure element 10. These lines of force have much greater effect than those operating in directions trying to unseat the closure element 10 from the O-ring seal 51. Accordingly, the force of the water pressure tends to maintain the closure element 10 seated against the O-ring seal 51.

When rotor 20 is turned through 90°, the domed head 12 of closure element 10 moves from the position shown in solid line in FIG. 5 to the position shown in dotted line. In the dotted line position, the domed head 12 of the closure element 10 seats tightly against the O-ring seal 51, thereby preventing flow of water through OUT port 35.

When the rotor 20 is first moved during turning of the closure element 10 to move it from the solid line position to the dotted line position, the O-ring seal 51 is engaged by a rising surface of the dome-like head 12 and the closure element is cammed inwardly on the mushroom pin 23 causing relative movement of the pin 23 more deeply into the bore 15. This inward movement of closure element 10 facilitates the ease with which the rotor 20 is rotated through 90° from one position to another. When, in FIG. 5, the closure element 10 is seated in the position shown in dotted lines, the flow of water is from the source in through IN port 33 and out through OUT port 37 to the filter system to provide, for example, drinking water. The pressure is high against the under-surface 59 of the domed head 12 and the closure element 10 is maintained in tight contact with the O-ring seal 51.

The operation of the diverter valve 11 in the present invention in remarkably easy. At the beginning of rotation of the rotor 20, the camming action of O-ring seal 51 on the low angled surface of the head 12 causes the mushroom element 10 to move back, i.e., inwardly, on the mushroom pin 23 against the action of compression spring 55. As the mushroom element 10 is turned rotationally by the rotor 20, pressure of the source water acts constantly on the flat under-surface 59 of the head 12 trying to move the head radially outwardly. When the head 12 gets into the next closing position at the next OUT port, the force of the water pressure approaches maximum and tends to seat the closure element in optimum position. Because of the angles of incidence involved between the head 12 and the O-rings 51, very little manual force is required to operate the rotor 20, even thought the water pressure may be 70 or 80 pounds per square inch (psi), or more.

The light compression spring 55, shown in FIGS. 4 and 5 is helpful but is not a necessary element. Spring 55 helps to keep the mushroom closure element 10 continually positioned relative to the O-rings 51 so that the closure element 10 always stays in good orientation. If, for example, the source of water pressure should be shut off, the spring 55 keeps the O-ring seals 51 of the closed OUT port in position until water pressure is restored.

An advantage of the diverter valve 11 shown in FIGS. 1-5 and described here and above, is that the force of flow of water through the valve 11 is controlled by the faucet and hence may be strong or weak or anywhere therebetween as is desired. Unlike typical prior art diverter valves of the type that depend upon high pressure to keep a toggle or plunger in a selected position, the diverter valve 11 does not depend upon high pressure to keep it in a selected position. The selected position of diverter valve 11 is determined by rotating rotor 20 to the desired position, and the diverter valve 11 remains in the selected position until rotor 20 is rotated to another desired position. Accordingly, unlike typical toggle or plunger type diverter valves, the diverter valve 11 may be operated even at low flow rates. In other words, the diverter valve 11 of the present invention takes advantage of the very fine flow control which is inherent in modern day faucets and does not become inoperative at low flow rates.

When the diverter valve 11 is used in conjunction with a water purification unit to obtain purified water as desired, the diverter valve 11 may be preset to have water flow through the water purification unit (via OUT port 37) rather than through the normal outlet (OUT port 35). Since small children ordinarily merely turn on a faucet, and do not adjust a diverter valve attached to the faucet, the water that the children get is under the control of the parent who has previously preset the diverter valve 11 to divert water through the water purification unit. This is an advantage over the typical prior art toggle or plunger type diverter valves since such a pre-setting is not possible with the typical prior art toggle or plunger type diverter valves because stoppage of water flow through such valves causes the toggle or plunger to return to its non-actuated position where water flows through its normal outlet rather than being diverted through the water purification unit.

Another advantage of the diverter valve 11 of the present invention is that the IN port and OUT ports are quite large relative to the entry and exit orifices found in the typical prior art diverter valves of the type which depend upon high water pressure to keep a toggle or plunger in a selected position. Because of the need to develop the necessary high pressure to maintain the position of the toggle or plunger, a much higher water pressure is required to get a reasonable flow of water from such diverter valves. In contrast thereto, the diverter valve 11 of the present invention has ports whose cross sectional area is three or four times larger than that of typical prior art diverter valves. Thus, the new valve 11 allows the system to be operated at very low pressure to produce very high flow rates.

Yet another advantage of the new diverter valve 11 is that it is very easy to disassemble. The diverter valve can be completely disassembled and any seal replaced without the use of any tools. Disassembly of the valve is accomplished by removing it from the faucet connector 41, removing the gasket 42, and turning the valve body 30 upside down so that body pin 27 ma slide out of bore 38. With body pin 27 removed, rotor 20 is free to be pulled from valve body 30. Removing rotor 20 allows easy access to the interior of the cavity 31, to replace either O-ring seal 51, if necessary. Reassembly is accomplished by reversing the above steps.

Figure 6:
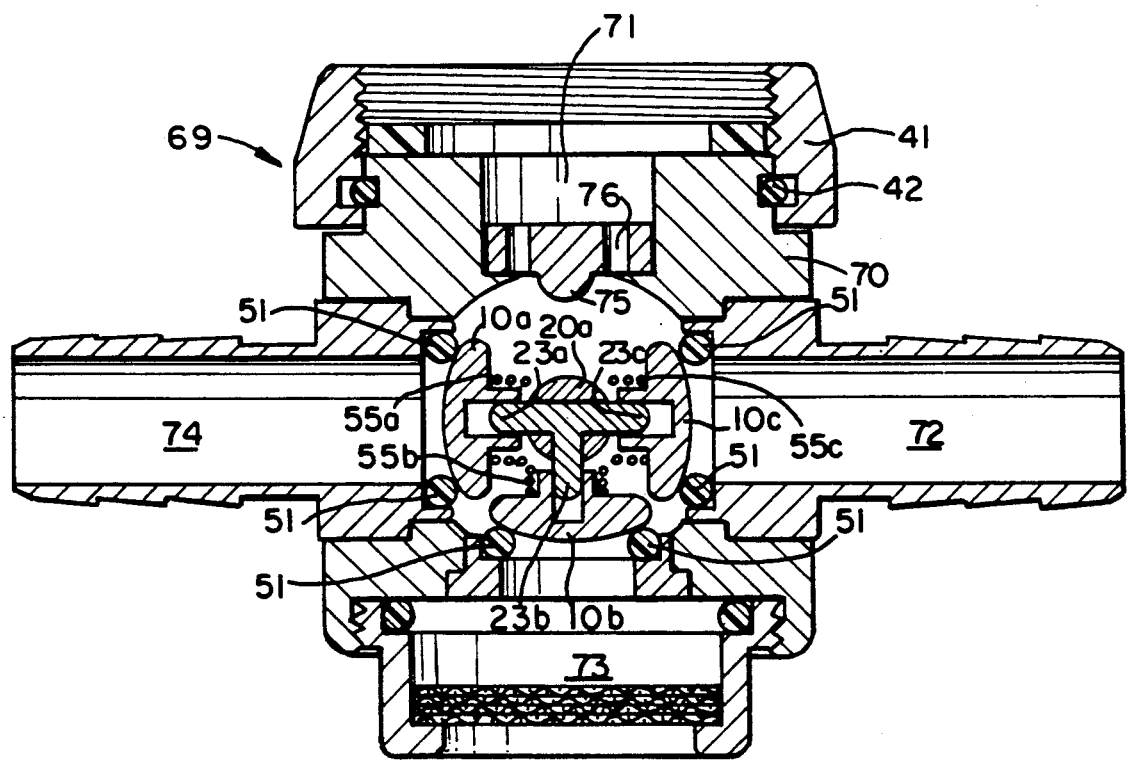
FIG. 6 is a view, in section, illustrating an alternative embodiment in which the diverter valve has three OUT ports and three mushroom closure elements.

FIG. 6 illustrates an alternative embodiment of the invention. The diverter valve 69 shown in FIG. 6 has an IN port 71 and three OUT ports 72, 73, 74 formed in valve body 70. At least two of the OUT ports are always closed. In FIG. 6, all OUT ports are shown to be closed. The valve has three closure elements 10a, 10b, 10c. The source water enters in IN port 71 and may exit through one of the OUT ports as desired. When the rotor is turned 90°, clockwise as viewed in FIG. 6, closure element 10a moves into position at IN port 71 and OUT port 74 and 73 are closed by closure elements 10b and 10c. OUT port 72 is opened. It is to be noted that in the embodiment of FIG. 6, a semi-annular opening 76 at IN port 71 is provided. The center region surrounded by the annular opening is extended to provide a camming surface 75 which projects into the path of the domed heads of the closure elements 10a, 10b, 10c as they are rotated by the rotor 20a. Thus, when closure element 10a is moved into position at IN port 71 the flow of source water of through IN port 71 is not shut off since the inwardly projecting camming surface 75 functions to cam closure element 10a inwardly on pin 23a thereby leaving the annular passage 76 open for flow of source water.

Figure 7:
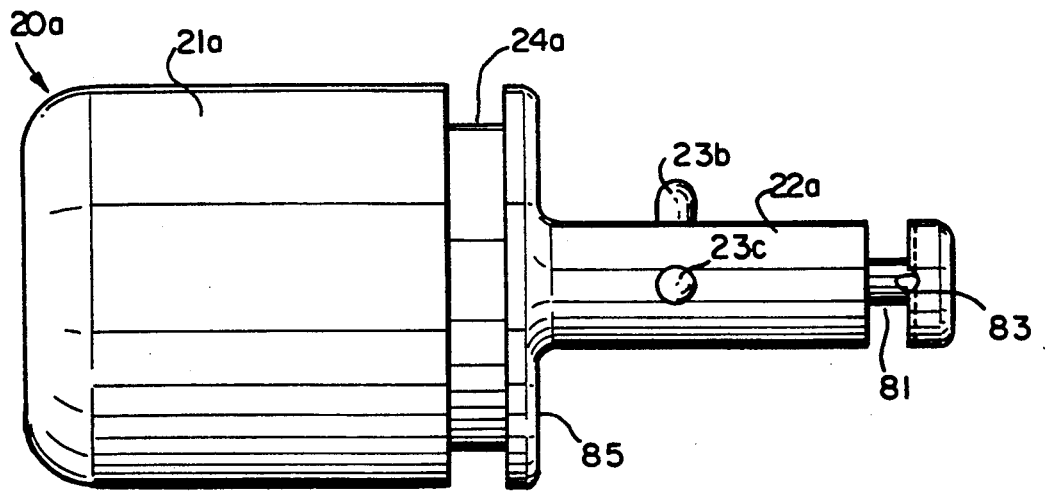
FIG. 7 is a view in front elevation of a rotor used in FIG. 6 having mushroom pins mounted thereon.

FIG. 7 shows the rotor 20a of the alternative embodiment shown in FIG. 6. Rotor 20a has a control knob 21a, a groove 24a in control knob 21a for receiving an O-ring, a stem 22a, and mushroom pin portions 23b and 23c mounted on stem 22a. (Mushroom pin portion 23a is shown in FIG. 6.) Mushroom pin portions 23a and 23c are the end portions of a single pin that extends through stem 22a, and mushroom pin 23b is a single pin that extends through stem 22a and is mounted on the single pin that forms mushroom pin portions 23a and 23c.

As shown in FIG. 6, mushroom pin portions 23a, 23b and 23c receive mushroom closure elements 10a, 10b, and 10c, and, optionally, springs 55a, 55b, and 55c are provided to help keep mushroom closure elements 10a, 10b, and 10c continually positioned relative to the O-rings 51 so that the mushroom closure elements 10a, 10b, and 10c always stay in good orientation.

As shown in FIG. 7, a groove 81 is provided in stem 22a. Groove 81 extends 360° around stem 22a and is adapted to receive the end of a body pin 27 (not shown in FIGS. 6 and 7) which is mounted in valve body 70 and which has a portion that extends into groove 81 to connect rotor 20a to valve body 70.

Groove 81 is provided with four detents 83, each detent 83 being spaced 90° from the adjacent detent 83. The detents 83 are positioned to engage body pin 27 when the diverter valve 69 is in any of its open positions or in its closed position. Since the force of the water flowing through the diverter valve 69 acts in a direction normal to the inner surface of the valve body 70, the force of the water pushes outwardly on surface 85 of the control knob 21a exposed to the water, pushing rotor 20a outwardly. As rotor 20a is rotated, engagement between the body pin 27 and a detent 83 can be felt through control knob 21a each time a detent 83 clicks ag inst pin 27.

Diverter valve 69 may be assembled and disassembled in a fashion similar to diverter valve 11.

The components of diverter valve 11, 69, such as the valve body 30, 70, the rotor 20, 20a, and pins 23, 23a, 23b, 23c, 38, may be made of metal, plastic, and the like. The mushroom closure element 10, 10a, 10b, 10c may be made of metal, plastic or rubber. When the mushroom closure element 10, 10a, 10b, 10c is made of rubber, no O-rings 51 are necessary to obtain a seal between the mushroom closure element 10, 10a, 10b, 10c and the OUT ports. Similarly, when the mushroom closure element 10, 10a, 10b, 10c is made of plastic, no O-rings are necessary.

The invention may be used as an ON-OFF valve, as illustrated in FIG. 6. Further, the invention may be used as an ON-OFF valve by providing only one OUT port such as by eliminating one of the OUT ports 35 or 37 of the embodiment of the invention shown in FIGS. 1–5.

The total number and position of mushroom closure pins 23 mounted on stem 22 and the corresponding mushroom closure elements 10 mounted on pins 23 is variable, depending on the number and position of the OUT ports and the intended use of the valve.

I claim:
1. A diverter valve comprising
  a valve body having a cavity therein, an IN port for receiving water from a source and first and second OUT ports,
  a rotor having a stem projecting into said cavity and a control knob projecting outside said valve body,
  a pin mounted on said rotor stem and projecting therefrom,
  a mushroom shaped closure element having a domed head and a hub portion having a bore, said closure element being so positioned that the center axis of said hub portion coincides with the center axis of said pin mounted on said rotor stem, said pin projecting into said hub bore,
  said closure element being movable from one OUT port to the other OUT port by rotational movement of said rotor,
  whereby when water pressure is applied to said IN port and said closure element is positioned at one of said OUT ports, water pressure serves to maintain the closure element over said one OUT port while water exits at the other.
2. A diverter valve according to claim 1, further including
  an O-ring seal at each of said first and second OUT ports.

3. A diverter valve according to claim 1, said mushroom closure element having a recess in its domed head in line with said hub bore.

4. A diverter valve according to claim 1, further including a light compression spring surrounding the hub of the closure element.

5. A diverter valve according to claim 1,
the rotor having a groove formed in its stem,
the valve body having a bore formed therein, and further including
a second pin received in the bore in the valve body and having a portion extending from the bore in the valve body into the groove in the stem of the rotor to secure the rotor inside the valve body.

6. A diverter valve according to claim 5, said groove being arcuate and having an angular dimension corresponding to the angular distance between said first and second OUT ports.

7. A diverter valve according to claim 6, the annular dimension of said groove being 90°.

8. A diverter valve comprising
a valve body having a cavity therein, and IN port for receiving water from a source and first and second OUT ports,
a rotor having a stem projecting into said cavity and a control knob projecting outside said valve body,
a pin mounted on said rotor stem and projecting therefrom,
a mushroom shaped closure element having a domed head and a hub portion having a bore, said closure element being so positioned that the center axis of said hub portion coincides with the center axis of said pin mounted on said rotor stem, said pin projecting into said hub bore,
an O-ring seal at each of said first and second OUT ports,
said closure element being movable from one OUT port to the other OUT port by rotational movement of said rotor,
whereby when water pressure is applied to said IN port and said closure element is positioned at one of said OUT ports, water pressure serves to maintain the closure element in contact with the O-ring seal at said one OUT port while water exits at the other,
said mushroom closure element having a recess in its domed head in line with said hub bore,
further including a light compression spring provided within said recess in said domed head,
the rotor having a groove formed in its stem,
the valve body having a bore formed therein, and further including
a second pin received in the bore in the valve body and having a portion extending from the bore in the valve body into the groove in the stem of the rotor to secure the rotor inside the valve body,
said groove being arcuate and having an angular dimension corresponding to the angular distance between said first and second OUT ports, and
the annular dimension of said groove being 90°.

9. A diverter valve comprising:
a valve body having a cavity therein,
an IN port and first, second and third OUT ports formed in the valve body,
a rotor having a stem projecting into said cavity and a control knob outside said valve body,
first, second and third pins mounted on said rotor stem and projecting therefrom,
first, second and third mushroom-shaped closure elements each having a domed head and each having a hub portion having a bore, each of said closure elements being so positioned that the center axis of the hub portion coincides with the center axis of one of said pins mounted on said rotor stem, said pin projecting into the hub bore of its respective closure element,
each of first, second and third closure elements being movable simultaneously from one OUT port to another by rotational movement of said rotor,
said IN port having an annular opening and a center portion, the center portion being provided with a camming surface which projects into the cavity of said valve body into the path of movement of said domed head of one of said rotatable mushroom-shaped closure elements, said camming surface functioning to cam radially inwardly said one closure element to maintain open said annular opening in said IN port while the remaining two closure elements close two of said first, second and third OUT ports.

10. A diverter valve according to claim 9, further including
an O-ring seal at each of said first, second and third OUT ports.

11. A diverter valve comprising
a valve body having a cavity therein,
a rotor having a stem projecting inwardly through said cavity in said body and a control knob external to said body,
a groove formed on the stem having an arcuate length of 90,
a body pin extending from the valve body into said groove connecting said rotor stem to said body, the rotary movement of said rotor being limited by the arcuate length of said groove,
a mushroom-shaped closure element having domed head and a hub having a bore for receiving a closure pin,
a closure pin mounted on the rotor stem and for projecting from the axis of said rotor stem and received within the bore of said hub of the closure element, the length of said closure pin allowing sliding movement of said domed head on said closure pin in the axial direction of said pin,
an IN port for said valve body,
at least two OUT ports for said valve body, the spacing between OUT ports being 90° and being aligned such that the closure element may be rotated to seal each OUT port as desired, and
O-ring seals positioned at said OUT ports,
whereby when said rotor is turned to move said closure element into position at one of said OUT ports, said O-ring in sliding contact with the surface of the domed head of said closure element functions to cam said domed head inwardly on said closure pin thereby facilitating turning of said rotor.

12. A diverter valve according to claim 11, further including
a light compression spring surrounding the hub being adapted to be compressed when said closure element is cammed inwardly.

13. A diverter valve according to claim 11,
said hub bore extending into the domed head of said closure element to form a recess therein.

14. A valve comprising
a valve body having a cavity therien, an IN port and an OUT port formed in the valve body, and a diverter assembly mounted on the valve body and extending within said valve body, said diverter assembly including a rotor having a handle portion and a shaft portion extending away from said handle portion and into the valve body, a pin mounted on said shaft portion, and a mushroom-shaped sealing plug mounted on the pin, the mushroom-shaped sealing plug having a hollow shaft portion and a head portion, and said sealing plug slidably engaging said pin.

15. A valve according to claim 14, further including a light compression spring surrounding the hub of the closure element.

16. A valve comprising a valve body having a cavity therien, an IN port and an OUT port formed in the valve body, and a diverter assembly mounted on the valve body and extending within said valve body, said diverter assembly including a rotor having a handle portion and a shaft portion extending away from said handle portion and into the valve body, a pin mounted on said shaft portion, and a mushroom-shaped sealing plug mounted on the pin, the rotor having a groove, formed in its stem, the valve body having a bore formed therein, and further including a second pin received in the bore in the valve body and having a portion extending from the bore in the valve body into the groove in the stem of the rotor to secure the rotor inside the valve body.

17. A valve according to claim 16, further including a second OUT port, said groove being arcuate and having an angular dimension corresponding to the angular distance between said first and second OUT ports.

18. A valve according to claim 17, the annular dimension of said groove being 90°.

* * * * *